(12) United States Patent
Takagi

(10) Patent No.: US 9,821,820 B2
(45) Date of Patent: Nov. 21, 2017

(54) LIGHTING DEVICE

(71) Applicant: LECIP HOLDINGS CORPORATION, Motosu-shi, Gifu-ken (JP)

(72) Inventor: Naoyuki Takagi, Motosu (JP)

(73) Assignee: LECIP HOLDINGS CORPORATION, Motosu-Shi (JP)

( * ) Notice: Subject to any disclaimer, the term of this patent is extended or adjusted under 35 U.S.C. 154(b) by 0 days.

(21) Appl. No.: 15/321,051

(22) PCT Filed: Jun. 23, 2014

(86) PCT No.: PCT/JP2014/066550
§ 371 (c)(1),
(2) Date: Dec. 21, 2016

(87) PCT Pub. No.: WO2015/198375
PCT Pub. Date: Dec. 30, 2015

(65) Prior Publication Data
US 2017/0151962 A1 Jun. 1, 2017

(51) Int. Cl.
*B60Q 3/18* (2017.01)
*B61D 29/00* (2006.01)
*B60Q 3/80* (2017.01)

(52) U.S. Cl.
CPC ............ *B61D 29/00* (2013.01); *B60Q 3/80* (2017.02)

(58) Field of Classification Search
CPC combination set(s) only.
See application file for complete search history.

(56) References Cited

U.S. PATENT DOCUMENTS

2009/0213600 A1 8/2009 Vanhelle et al.

FOREIGN PATENT DOCUMENTS

| JP | H05-16728 A | 1/1993 |
| JP | H07-61283 A | 3/1995 |
| JP | H10-335074 A | 12/1998 |
| JP | H11-214169 A | 8/1999 |
| JP | 2005-071776 A | 3/2005 |
| JP | 2008-513294 A | 5/2008 |
| JP | 2010-153335 A | 7/2010 |

OTHER PUBLICATIONS

Japanese Patent Office, International Search Report in underlying International Application No. PCT/JP2014/066550, dated Aug. 19, 2014, 4 pages.
International Preliminary Report on Patentability dated Dec. 27, 2016, in International Application No. PCT/JP2014/066550.

*Primary Examiner* — Douglas W Owens
*Assistant Examiner* — Jianzi Chen
(74) *Attorney, Agent, or Firm* — Andrews Kurth Kenyon LLP

(57) ABSTRACT

A lighting device includes a light source disposed inside of a vehicle, an external light sensor that detects illuminance of light outside of the vehicle, and a controller that controls the light source such that a lower light intensity ratio of the light source is set for higher illuminance detected by the external light sensor. The controller performs a light intensity ratio maintaining control that maintains the light intensity ratio of the light source even when the illuminance changes from a low state to a high state during a period from when a change amount of the illuminance exceeds a predetermined value until a predetermined period elapses.

5 Claims, 5 Drawing Sheets (Embodiment)
(Case B)

(Comparative Example)

LIGHTING DEVICE

CROSS-REFERENCE TO RELATED APPLICATION

This is a national phase application based on the PCT International Patent Application No. PCT/JP2014/066550 filed Jun. 23, 2014, the entire content of which is incorporated herein by reference.

TECHNICAL FIELD

The art disclosed herein relates to a lighting device disposed in a vehicle.

BACKGROUND ART

Japanese Patent Application Publication No. H10-335074 (hereinafter referred to as Patent Literature 1) discloses a lighting device including a light source. The lighting device detects brightness of a lighting area which should be lightened by the lighting device and calculates a difference between the detected brightness and a predetermined brightness. Then, the lighting device changes a light intensity ratio of the light source based on the calculated difference such that the lighting area comes to have the aforementioned predetermined brightness.

SUMMARY OF INVENTION

Technical Problem

In the lighting device of Patent Literature 1, when the brightness of the lighting area frequently changes, the light intensity ratio of the light source also frequently changes according to these changes. In such a situation, a human may perceive discomfort since the human may possibly perceive the changes of the light intensity ratio frequently. The present teachings disclose an art capable of preventing a human from frequently perceiving changes of a light intensity ratio.

Solution to Technical Problem

The present description discloses a lighting device disposed in a vehicle, the lighting device comprising: a light source disposed inside the vehicle; an external light sensor configured to detect illuminance of light outside of the vehicle; and a controller configured to control the light source such that a lower light intensity ratio of the light source is set for higher illuminance detected by the external light sensor, wherein the controller performs a light intensity ratio maintaining control that controls the light intensity ratio of the light source to be maintained even when the illuminance changes from a low state to a high state during a period from when a change amount of the illuminance exceeds a predetermined value until a predetermined period elapses. According the above configuration, since the lighting device is capable of preventing the light intensity ratio of the light source from changing frequently within a short period of time, a human may be prevented from perceiving frequently the changes of the light intensity ratio.

The controller may control the light source such that the light intensity ratio of the light source is set lower in a case where the illuminance changes from the low state to the high state during the period and the illuminance is in the high state when the predetermined period elapses. According to such configuration, the lighting device can appropriately control the light source in accordance with the illuminance of the external light after the predetermined period has elapsed.

The controller may perform the light intensity ratio maintaining control during the period from when the change amount of the illuminance changing from the high state to the low state exceeds the predetermined value until the predetermined period elapses, and the controller may not perform the light intensity ratio maintaining control even when the change amount of the illuminance changing from the low state to the high state exceeds the predetermined value. According to such configuration, the lighting device can appropriately control the light source in accordance with a direction in which the illuminance changes.

In a case where the change amount of the illuminance does not exceed again the predetermined value before the predetermined period has elapsed after the change amount of the illuminance had previously exceeded the predetermined value at a first timing, the controller may perform the light intensity ratio maintaining control during a period from the first timing until the predetermined period elapses, and in a case where the change amount of the illuminance exceeds again the predetermined value at a second timing before the predetermined period has elapsed after the change amount of the illuminance had previously exceeded the predetermined value at the first timing, the controller may perform the light intensity ratio maintaining control during a period from the first timing until the second timing, and may perform the light intensity ratio maintaining control during a period from the second timing until the predetermined period elapses. According to such configuration, the lighting device can perform the light intensity ratio maintaining control for an appropriate period.

The controller may control the light source such that the light intensity ratio becomes higher by a first value per unit time in a case where the illuminance changes from the high state to the low state, and the controller may control the light source such that the light intensity ratio becomes lower by a second value per unit time in a case where the illuminance changes from the low state to the high state, the second value being smaller than the first value. According to such configuration, the lighting device can appropriately control a speed by which the light intensity ratio changes in the light source in accordance with the direction in which the illuminance changes.

A control method, computer-readable instructions, and a non-transitory computer-readable medium storing the computer-readable instructions, for achieving the above lighting device are also new and useful.

Figure 1:
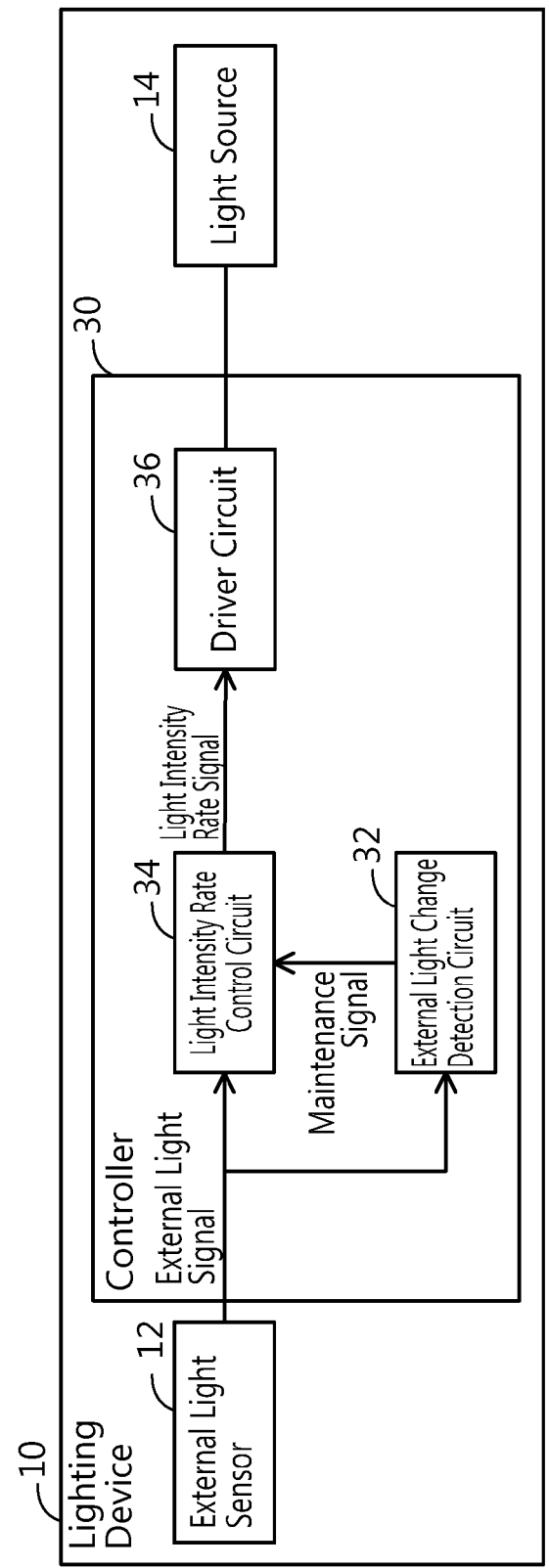
FIG. 1 shows a configuration of a lighting device.

DESCRIPTION OF EMBODIMENTS (Configuration of Lighting Device 1; FIG. 1)

With reference to FIG. 1, a configuration of a lighting device 10 will be described. The lighting device 10 is disposed in a railway car (hereinafter referred to as a "vehicle"). The lighting device 10 comprises an external light sensor 12, a light source 14, and a controller 30. The external light sensor 12 detects an illuminance of light outside of the vehicle, and outputs an external light signal indicative of the illuminance to the controller 30. The light source 14 is disposed inside the vehicle. The light source 14 is for example, an LED (abbreviation of Light Emitting Diode) lamp, a florescent lamp, a high-pressure discharge lamp, etc.

The controller 30 controls the light source 14 in accordance with an external light signal inputted from the external light sensor 12. Specifically, the controller 30 controls the light source 14 such that a lower a light intensity ratio is set for the light source 14 for higher illuminance indicated by the external light signal. In other words, the controller 30 controls the light source 14 such that the lower the illuminance indicated by the external light signal is, the higher a light intensity ratio of the light source 14 becomes. That is, the controller 30 reduces power consumption of the light source 14 by lowering the light intensity ratio of the light source 14 in a situation where the inside of the vehicle is bright with the external light, whereas the controller 30 makes the inside of the vehicle brighter by heightening the light intensity ratio of the light source 14 in a situation where the inside of the vehicle is dark due to external light.

The light intensity ratio is an amount that defines the brightness of the light source 14, and is 100% in the brightest state and 0% in the darkest state (that is, a state where the light source 14 is off). The light intensity ratio can be rephrased as follows. For example, the light intensity ratio is a ratio of an actual luminous flux (unit is lm (lumen)) of the light source 14 to a maximum luminous flux of the light source 14. Instead of the above luminous flux, luminous intensity (unit is cd (candela)), luminance (unit is cd/m), or illuminance (unit is lx (lux)) may be employed. Further, the luminous flux is substantially proportional to an amount of current (unit is A (Ampere)) that is supplied to the light source 14. Due to this, the light intensity ratio can be described as practically, for example, a ratio of an amount of current that is actually supplied to the light source 14 to a maximum current amount that can be supplied to the light source 14.

The controller 30 comprises an external light change detection circuit 32, a light intensity ratio control circuit 34, and a driver circuit 36. The external light change detection circuit 32 computes a change amount of the illuminance indicated by the external light signal. Specifically, the external light change detection circuit 32 computes the illuminance change amount by computing a differential coefficient of the external light signal. That is, the illuminance change amount is the illuminance change amount during a brief period that is predetermined. In a case where the illuminance change amount, of the illuminance indicated by the external light signal changing from a high state to a low state, exceeds a predetermined value, the external light change detection circuit 32 outputs a maintaining signal for maintaining the light intensity ratio of the light source 14 during a period from when the change amount exceeds the predetermined value until the predetermined period elapses. However, in a case where the change amount, of the illuminance indicated by the external light signal changing from the low state to the high state, exceeds the predetermined value, the external light change detection circuit 32 does not output the maintaining signal to the light intensity ratio control circuit 34.

The external light change detection circuit 32 comprises a not-shown timer, and starts the timer at a time when the output of the maintaining signal begins. The external light change detection circuit 32 terminates the output of the maintaining signal to the light intensity ratio control circuit 34 at a time when a count value of the timer passes a predetermined period (for example, five seconds). Due to this, the external light change detection circuit 32 can output the maintaining signal to the light intensity ratio control circuit 34 during the period from when the external light change amount exceeds the predetermined value until the predetermined period elapses. Notably, the external light change detection circuit 32 resets the count value of the timer and restarts the timer in a case where the illuminance change amount exceeds the predetermined value again before the timer count value passes the predetermined period. That is, the external light change detection circuit 32 outputs the maintaining signal to the light intensity ratio control circuit 34 during a period from when the illuminance change amount exceeds the predetermined value until the illuminance change amount exceeds the predetermined value again, and outputs the maintaining signal to the light intensity ratio control circuit 34 during a period from when the illuminance change amount exceeds the predetermined value again until the predetermined period elapses.

The light intensity ratio control circuit 34 outputs a light intensity ratio signal corresponding to the illuminance indicated by the external light signal to the driver circuit 36. Specifically, the light intensity ratio control circuit 34 outputs the light intensity ratio signal indicating a lower light intensity ratio to the driver circuit 36 for a higher illuminance indicated by the external light signal, and the light intensity ratio control circuit 34 outputs the light intensity ratio signal indicating a higher light intensity ratio to the driver circuit 36 for a lower illuminance indicated by the external light signal. However, the light intensity ratio control circuit 34 performs operations (1) and (2) as follows during a period from when the input of the maintaining signal from the external light change detection signal 32 starts until the input of the maintaining signal terminates. (1) The light intensity ratio control circuit 34 outputs the light intensity ratio signal for maintaining the light intensity ratio of the light source 14 to the driver circuit 36 without outputting the light intensity ratio signal for lowering the light intensity ratio of the light source 14 to the driver circuit 36 even when the illuminance indicated by the external light signal changes from the low state to the high state. Thus, because the light intensity ratio of the light source 14 is maintained, even when the external light illuminance changes frequently such as when the vehicle passes through a plurality of short tunnels continuously, it is possible to prevent the light intensity ratio of the light source 14 from changing frequently during such short periods of time. As a result, a human may be prevented from perceiving changes of the light intensity ratio frequently. (2) The light intensity ratio control circuit 34 outputs the light intensity ratio signal for heightening the light intensity ratio of the light source 14 to the driver circuit 36 when the illuminance indicated by the external light signal changes from the high state to the low state.

Further, the light intensity ratio control circuit 34 outputs the light intensity ratio signal to the driver circuit 36 in the following manners. For example, at a time when the vehicle enters a tunnel, the illuminance indicated by the external light signal changes rapidly from the high state to the low state. In this case, the light intensity ratio control circuit 34 changes at a high speed following the rapid change of the illuminance indicated by the external light signal, from a state of outputting the light intensity ratio signal indicating a low light intensity ratio to a state of outputting the light intensity ratio indicating a high light intensity ratio. This enables the light intensity ratio of the light source 14 to become higher instantly immediately after the vehicle enters the tunnel. Further, for example, at a time when the vehicle comes out of the tunnel, the illuminance indicated by the external light signal changes rapidly from the low state to the high state. In this case, the light intensity ratio control circuit 34 changes at a low speed from the state of outputting the light intensity ratio signal indicating a high light intensity ratio to the state of the outputting the light intensity ratio signal indicating a low light intensity ratio without following the rapid change of the illuminance indicated by the external light signal. This makes it possible for the light intensity ratio of the light source 14 to be prevented from lowering suddenly immediately after the vehicle has come out of the tunnel. As a result of this, a human may be prevented from perceiving the changes of the light intensity ratio, and giving the human a sense of discomfort may be prevented. That is, the light intensity ratio control circuit 34 controls the light source 14 such that the light intensity ratio of the light source 14 becomes higher by a first value per unit time (that is, changes at a higher speed) in a case where the illuminance indicated by the external light signal changes from the high state to the low state, and controls the light source 14 such that the light intensity ratio of the light source 14 becomes lower by a second value, which is smaller than the first value, per unit time (that is, changes at a lower speed) in a case where the illuminance indicated by the external light signal changes from the low state to the high state.

The driver circuit 36 controls the light source 14 in accordance with the light intensity ratio signal inputted from the light intensity ratio control circuit 34. Specifically, the driver circuit 36 controls the current amount that should be supplied to the light source 14 in accordance with the light intensity ratio indicated by the light intensity ratio signal. That is, the driver circuit 36 increases the current amount that should be supplied to the light source 14 (that is, sets a higher light intensity ratio) as the light intensity ratio indicated by the light intensity ratio signal is higher, and decreases the current amount that should be supplied to the light source 14 (sets a lower light intensity ratio) as the light intensity ratio indicated by the light intensity ratio signal is lower.

Figure 2:
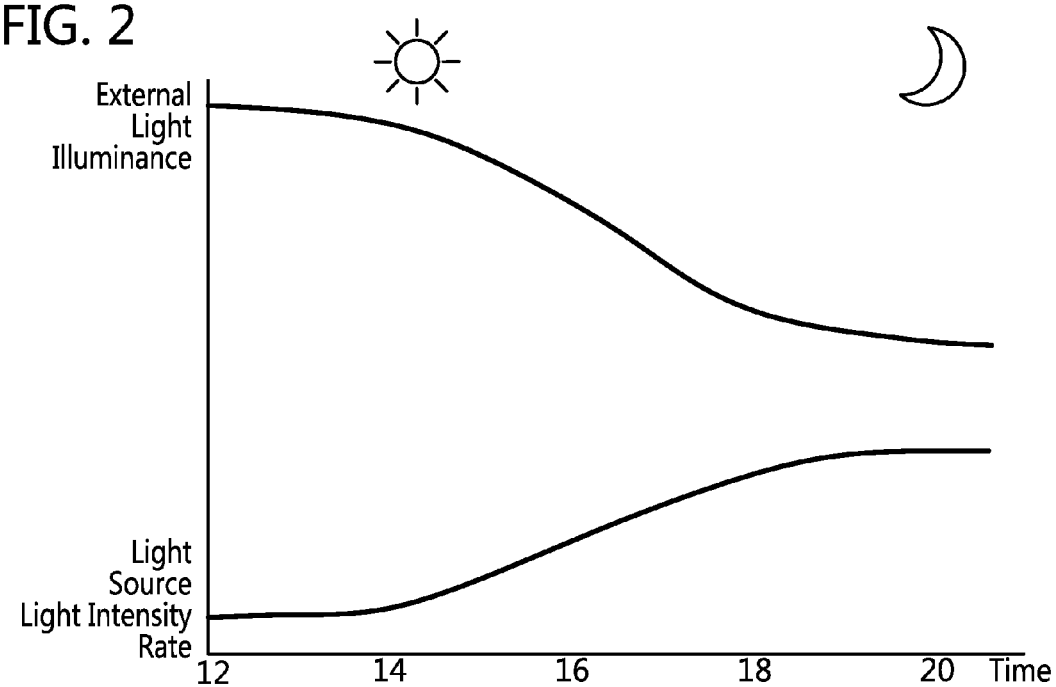
FIG. 2 shows changes of light intensity ratio in a light source in a case where a solar radiation quantity changes.

(Relation Between Change in Solar Radiation Amount and Light Intensity Ratio of Light Source 14; FIG. 2)

As mentioned above, in the lighting device 10, the light source 14 is controlled such that a lower light intensity ratio is set for the light source 14 for higher external light illuminance. Due to this, as shown in FIG. 2, the light intensity ratio of the light source 14 changes as follows in accordance with changes in a solar radiation amount. The solar radiation amount moderately changes from daytime to night time. Accordingly, the illuminance indicated by the external light signal changes moderately from a high state to a low state from daytime to night time. The external light change detection circuit 32 does not output the maintaining signal to the light intensity ratio control circuit 34 since the illuminance change amount does not exceed a predetermined value due to the external light illuminance changing moderately. Therefore, the light intensity ratio control circuit 34 outputs the light intensity ratio signal in accordance with the illuminance indicated by the external light signal to the driver circuit 36. As a result of this, the driver circuit 36 controls the light source 14 in accordance with the light intensity ratio signal inputted from the light intensity ratio control circuit 34 such that the light intensity ratio changes moderately from the low state to the high state from daytime to night time.

Figure 3:
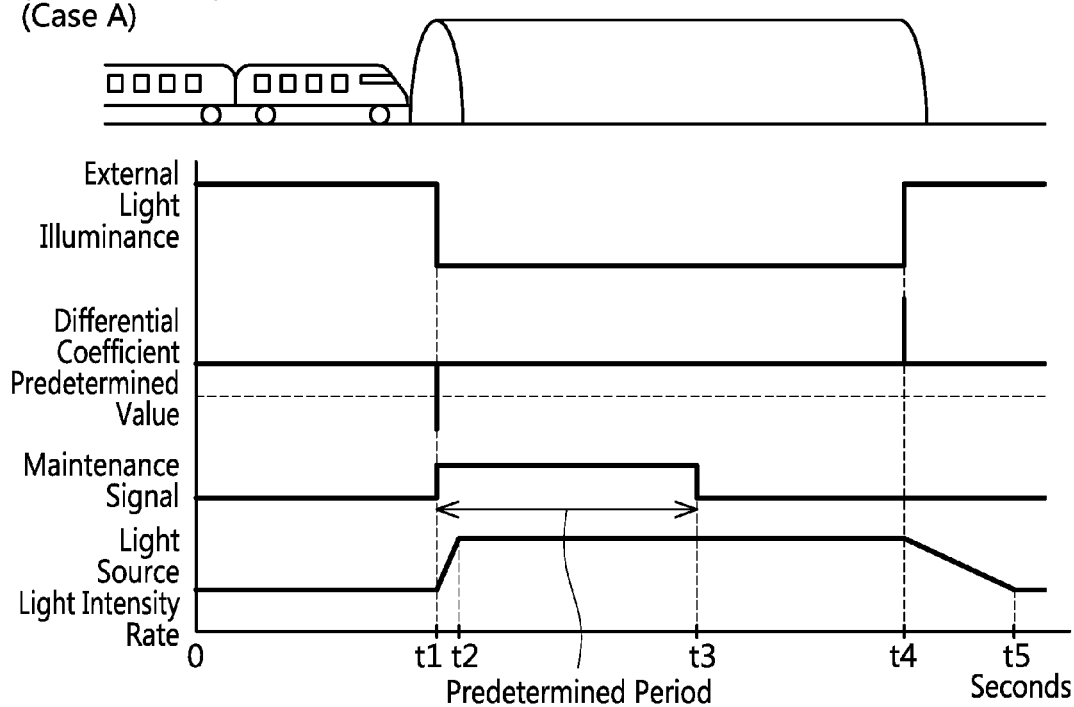
FIG. 3 shows a case A where a vehicle passes through a long tunnel.

(Case A; FIG. 3)

Next, with reference to FIG. 3, a case A where the vehicle passes through a long tunnel will be described. Prior to time t1, the vehicle runs outside the tunnel. Due to this, the illuminance indicated by the external light signal is relatively high prior to time t1. Accordingly, the light intensity ratio of the light source 14 is relatively low. Moreover, as the external light illuminance is substantially constant prior to time t1, the illuminance change amount (that is, an absolute value of the differential coefficient) does not exceed a predetermined value. Due to this, the maintaining signal is not outputted prior to time t1. Notably, a graph of the maintaining signal indicates that the maintaining signal is not outputted in a state such as prior to time t1 where the level of the signal is low, and indicates that the maintaining signal is outputted in a state such as time t2 where the level of the signal is high.

At time t1, the vehicle enters the long tunnel. Therefore, the illuminance indicated by the external light signal changes rapidly from the high state to the low state. Accordingly, from time t1 to time t2, the light intensity ratio of the light source 14 changes at a high speed from the low state to the high state. Due to this, it is possible to heighten instantly the light intensity ratio of the light source 14 immediately after the vehicle has entered the tunnel. A value obtained by dividing a difference between the light intensity ratio at time t1 and the light intensity ratio at time t2 by a difference between time t1 and time t2 is an example of the above "first value." Further, at time t1, the differential coefficient is a negative value (that is, the illuminance indicated by the external light signal is changing from the high state to the low state), and the absolute value of the differential coefficient exceeds the predetermined value. Due to this, at time t1, the output of the maintaining signal starts, and the count of the timer starts. Then, at time t3 when the timer count value passes the predetermined period, the output of the maintaining signal terminates.

At time t4, the vehicle comes out of the long tunnel. Due to this, the illuminance indicated by the external light signal changes rapidly from the low state to the high state. Since the maintaining signal is not being outputted at time t4, the light intensity ratio of the light source 14 changes at a low speed from the high state to the low state from time t4 to time t5. Due to this, it is possible to prevent the light intensity ratio of the light source 14 from suddenly becoming lower immediately after the vehicle has come out of the tunnel. A value obtained by dividing a difference between the light intensity ratio at time t4 and the light intensity ratio at time t5 by a difference between time t4 and time t5 is an example of the above "second value." Further, at time t4, the differential coefficient is a positive value (that is, the external light illuminance is changing from the low state to the high state). Due to this, the output of the maintaining signal is not started.

As mentioned above, in case A, the vehicle passes through the long tunnel. In this case, time taken from when the vehicle enters the tunnel to when the vehicle comes out of the tunnel is long. Due to this, even if the light intensity ratio of the light source 14 changes respectively at time t1 when the vehicle enters the tunnel and at time t4 when the vehicle comes out of the tunnel, the light intensity ratio of the light source 14 does not change during a short period of time. Due to this, a human does not frequently perceive the changes of the light intensity ratio taking place within a short period of time. Therefore, the lighting device 10 changes the light intensity ratio of the light source 14 from the low state to the high state when the vehicle enters the long tunnel, and changes the light intensity ratio of the light source 14 from the high state to the low state when the vehicle comes out of the long tunnel. Due to this, the lighting device 10 can appropriately adjust the light intensity ratio of the light source 14 in accordance with the external light illuminance.

Figure 4:
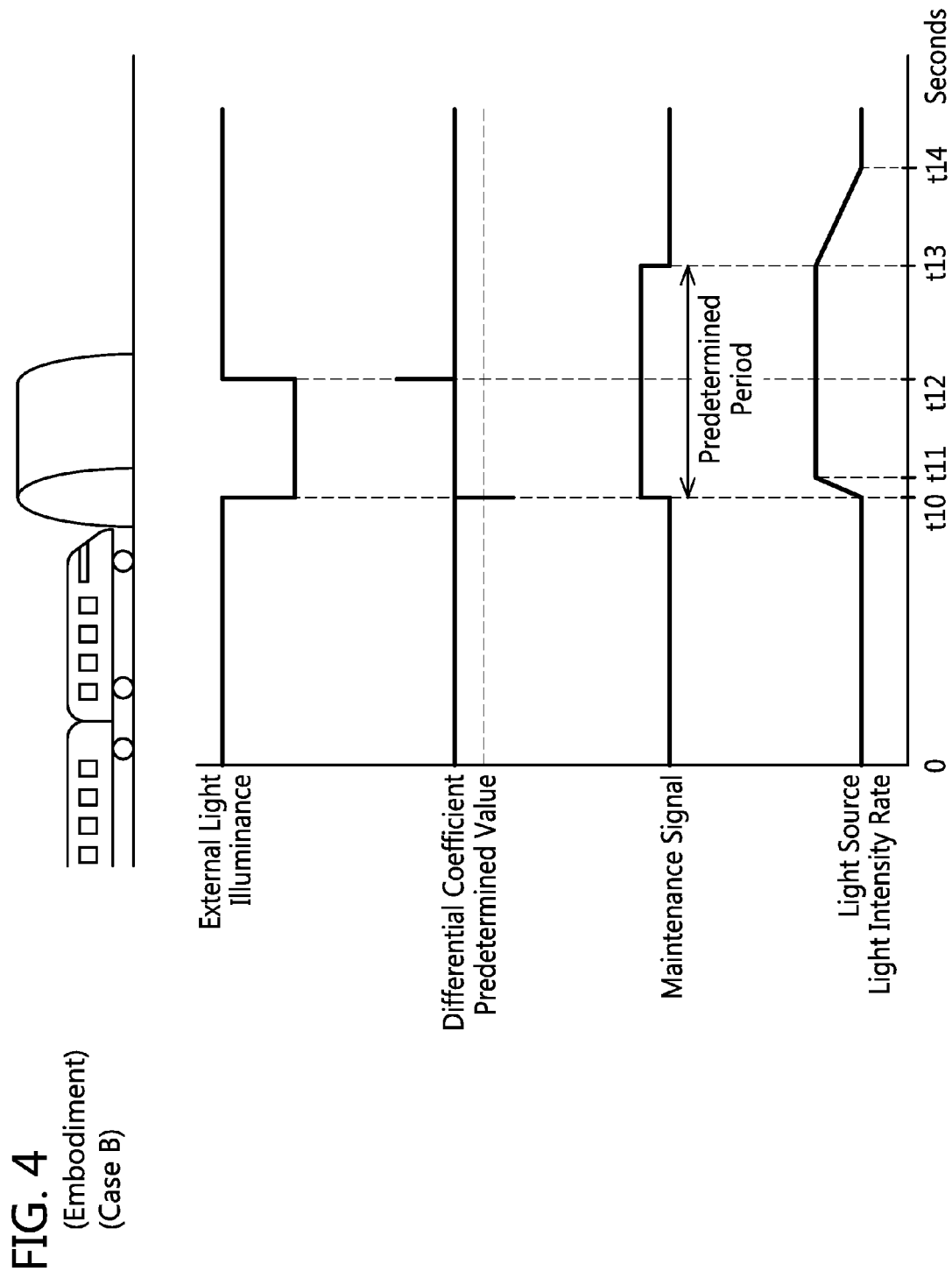
FIG. 4 shows a case B where the vehicle passes through one short tunnel.

(Case B; FIG. 4)

Next, with reference to FIG. 4, case B where the vehicle passes through one short tunnel will be described. Notably, although in the present embodiment the vehicle is assumed to pass through a tunnel, the same phenomenon occurs when the vehicle passes near a tree or a tall building, for example. This also applies to FIG. 5 that will be described later.

A state prior to time t10 is the same as the state prior to time t1 of FIG. 3. At time t10, as the vehicle enters the tunnel, the illuminance indicated by the external light signal changes rapidly from the high state to the low state. Accordingly, from time t10 to time t11, the light intensity ratio of the light source 14 changes at a high speed from the low state to the high state. This change is the same as the change of the light intensity ratio from time t1 to time t2 in FIG. 3. Further, at time t10, the differential coefficient is a negative value, and the absolute value of the differential coefficient exceeds the predetermined value. Due to this, at time t10, the output of the maintaining signal starts and the count of the timer starts.

At time t12, as the vehicle is coming out of the tunnel, the illuminance indicated by the external light signal changes rapidly from the low state to the high state. However, at time t12, the maintaining signal is being outputted. Due to this, even if the illuminance indicated by the external light signal changes from the low state to the high state, the light intensity ratio of the light source 14 is maintained. Further, at time t12, as the differential coefficient is a positive value, the timer is not reset.

At time t13 the timer count value passes a predetermined period, the output of the maintaining signal terminates. The illuminance indicated by the external light signal is changing from the low state to the high state at time t12, and is being maintained high at time t13. Due to this, from time t13 to time t14, the light intensity ratio of the light source 14 changes at a low speed from the high state to the low state. This change is the same as the change from time t4 to time t5 in FIG. 3.

As mentioned above, in case B, the vehicle passes through a short tunnel. In this case, the time taken from when the vehicle enters the tunnel to when the vehicle comes out of the tunnel is short. Due to this, as the light intensity ratio of the light source 14 changes respectively at time t10 when the vehicle enters the tunnel and time t12 when the vehicle comes out of the tunnel, a human may perceive the changes of the light intensity ratio frequently taking place within a short period of time. To avoid this, the lighting device 10 maintains the light intensity ratio of the light source 14 even though the external light illuminance changes from the low state to the high state at time t12 when the vehicle comes out of the tunnel. As a result of this, the human may be prevented from perceiving the changes of the light intensity ratio frequently taking place within a short period of time. As a result of this, since the human may be prevented from perceiving so-called flickering of light, giving a sense of discomfort to the human may be prevented.

Figure 5:
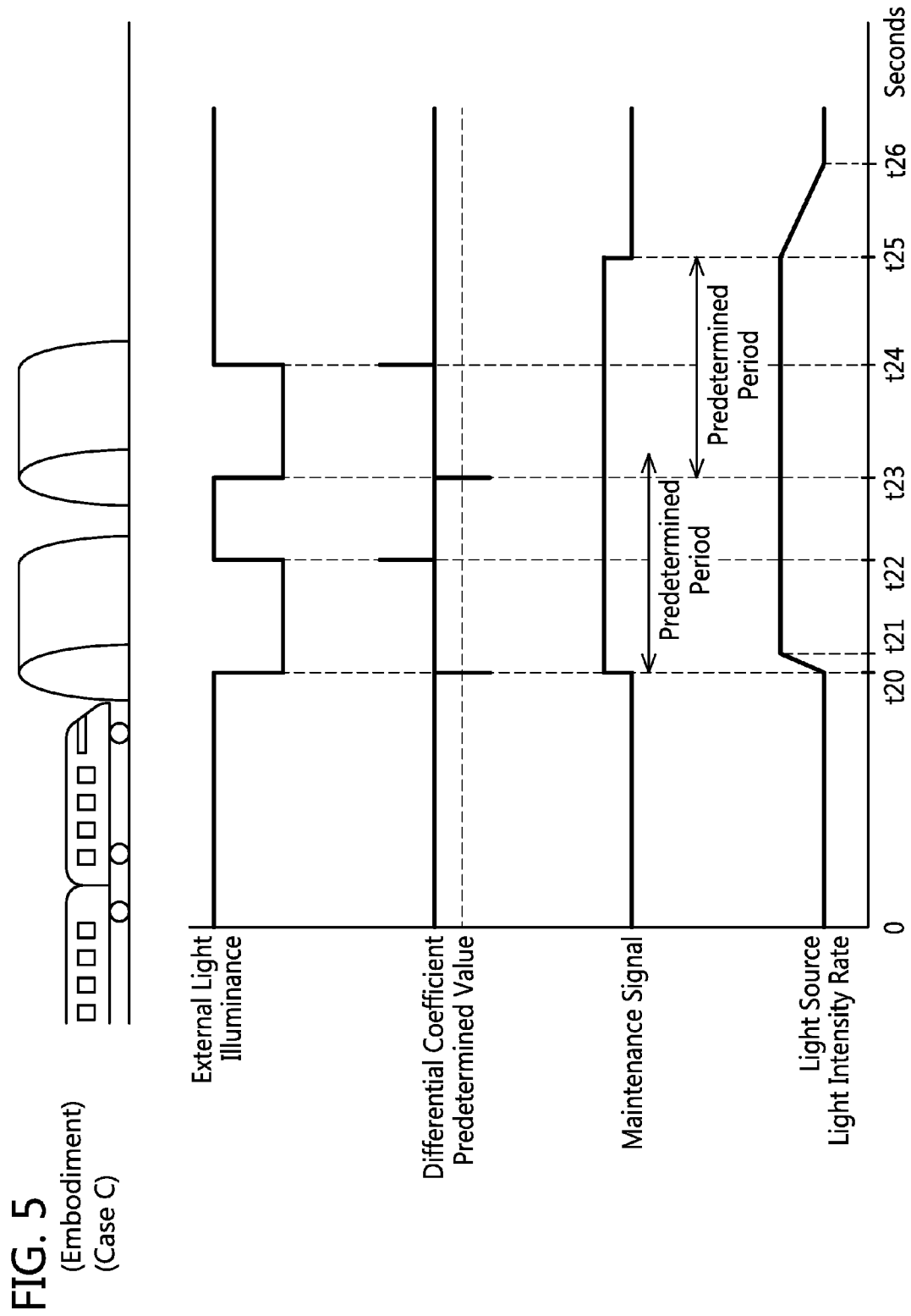
FIG. 5 shows a case C where the vehicle passes through two short tunnels.

(Case C; FIG. 5)

Next, with reference to FIG. 5, a case C where the vehicle passes through two short tunnels will be described. A state prior to time t20 is the same as the state prior to time t1 in FIG. 3. At time t20, as the vehicle is entering the first tunnel, the illuminance indicated by the external light signal changes rapidly from the high state to the low state. Accordingly, from time t20 to time t21, the light intensity ratio of the light source 14 changes at a high speed from the low state to the high state. Further, at time t20, the output of the maintaining signal starts, and the count of the timer starts.

At time t22, as the vehicle is coming out of the first tunnel, the illuminance indicated by the external light signal changes rapidly from the low state to the high state. Notably the maintaining signal is being outputted at time t22. Due to this, the light intensity ratio of the light source 14 is maintained even though the illuminance indicated by the external light signal changes from the low state to the high state. Further, since the differential coefficient is a positive value at time t22, the timer is not reset. At time t23, as the vehicle is entering the second tunnel, the illuminance indicated by the external light signal changes rapidly from the high state to the low state. Further, at time t23 (that is, in the state where the timer is counting), the differential coefficient is a negative value, and the absolute value of the differential coefficient exceeds the predetermined value. Due to this, at time t23, the count value of the timer is reset, and the count of the timer is restarted.

At time t24, as the vehicle is coming out of the second tunnel, the illuminance indicated by the external light signal changes rapidly from the low state to the high state. Notably, at time t24, the maintaining signal is being outputted. Due to this, the light intensity ratio of the light source 14 is maintained. Further, at time 24, as the differential coefficient is a positive value, the timer is not reset.

At time t25 the count value of the timer has passed a predetermined period, so the output of the maintaining signal terminates. The illuminance indicated by the external light signal changed from the low state to the high state at time t24, and at time t25, the illuminance indicated by the external light signal is maintained in the high state. Due to this, from time t25 to time t26, the light intensity ratio of the light source 14 changes from the high state to the low state at a low speed.

Figure 6:
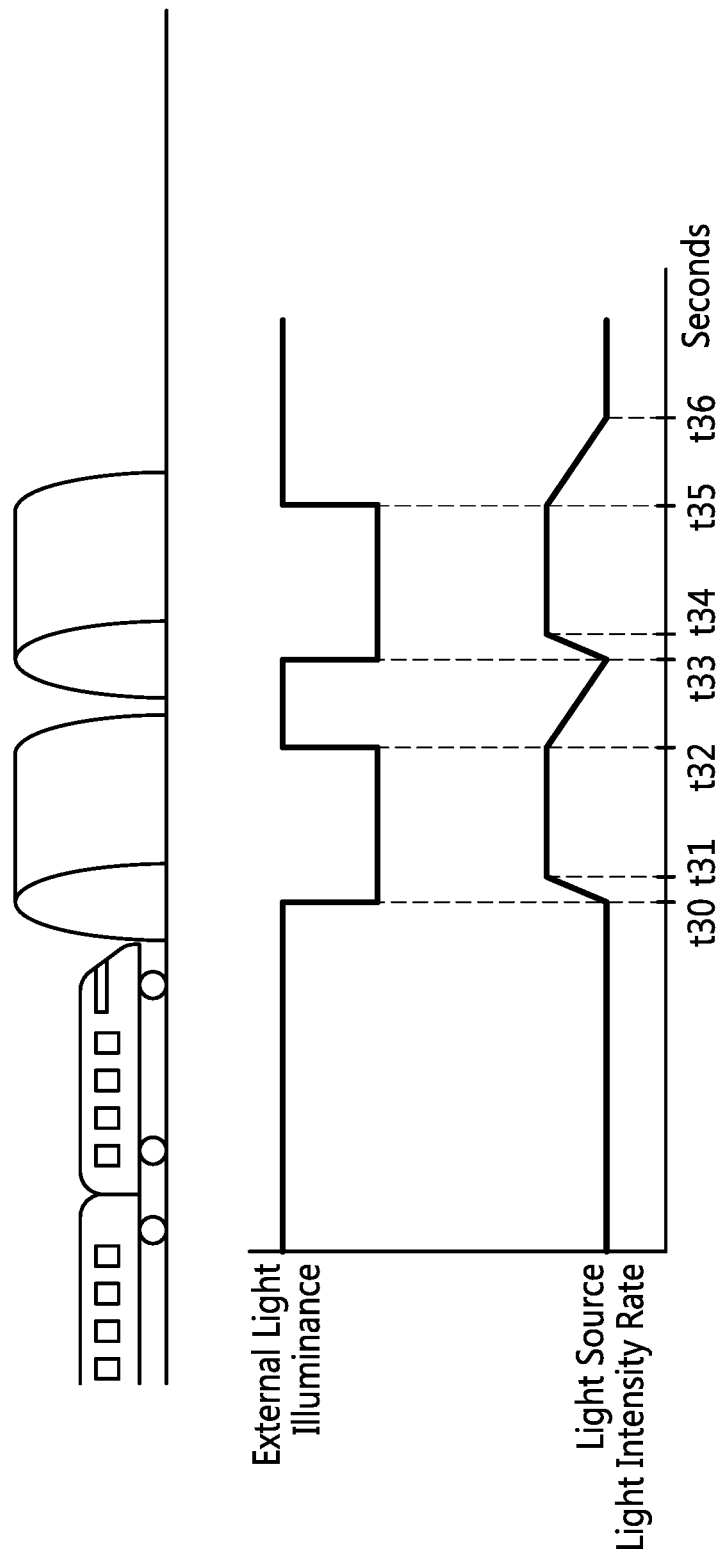
FIG. 6 shows a comparative example.

Comparative Example; FIG. 6

Next, in reference to FIG. 6, a lighting device in a comparative example will be described. The lighting device of the comparative example has a similar configuration (not shown) as the lighting device 10 of the present embodiment except the lighting device of the comparative example does not comprise the external light change detection circuit 32. In FIG. 6, a vehicle in which the lighting device of the comparative example is disposed passes through two short tunnels similar to case C in FIG. 5.

Since the lighting device of the comparative example does not comprise the external light change detection circuit 32, the maintaining signal is not outputted. Due to this, the light intensity ratio of the light source 14 becomes higher from time t30 when the vehicle enters the first tunnel to time t31, and the light intensity ratio of the light source 14 becomes lower from time t32 when the vehicle comes out of the first tunnel to time t33. Further, the light intensity ratio of the light source 14 becomes higher from time t33 when the vehicle enters the second tunnel to time t34, and the light intensity ratio of the light source 14 becomes lower from time t35 when the vehicle comes out of the second tunnel to time t36.

(Effects of Case C in FIG. 5)

As mentioned above, in Case C of FIG. 5 and the comparative example of FIG. 6, the vehicle passes through the two short tunnels. In this case, time taken from when the vehicle enters each tunnel to when the vehicle comes out of each tunnel is short. Further a distance between the two tunnels is short. In this case, time taken from when the vehicle comes out of the first tunnel to when the vehicle enters the second tunnel is short. Accordingly, with the configuration of the comparative example in FIG. 6, a human may perceive frequently changes of the light intensity ratio taking place within short periods of time since the light intensity ratio of the light source 14 changes respectively at time t30 and at time t33 when the vehicle enters each tunnel and time t32 and time t35 when the vehicle comes out of each tunnel. Contrary to this, in case C of FIG. 5, the lighting device maintains the light intensity ratio of the light source 14 even though the external light illuminance changes from the low state to the high state at time t22 when the vehicle comes out of the first tunnel. Furthermore, since the light intensity ratio of the light source 14 is maintained in the high state, the lighting device 10 again does not change the light intensity ratio of the light source 14 at time t23 when the vehicle enters the second tunnel. Due to this, a human may be prevented from perceiving the changes of the light intensity ratio frequently taking place within short periods of time. As a result of this, since the human may be prevented from perceiving the so-called flickering of light, giving the human a sense of discomfort may be prevented.

Specific examples of the present invention has been described in detail, however, these are mere exemplary indications and thus do not limit the scope of the claims. The art described in the claims include modifications and variations of the specific examples presented above. Modifications of the above-described embodiments will herein be listed.

(Modification 1)

In the above-mentioned embodiment, the "vehicle" is a railway car. Instead of this, in a modification, the "vehicle" may for example be another vehicle such as an ordinary car, and a bus.

(Modification 2)

In the above embodiment, the maintaining signal is outputted during the period (e.g., between times t1 to t3 in FIG. 3) from when the absolute value of the differential coefficient in a first case exceeds the predetermined value until the predetermined period elapses, the first case being a case where the external light illuminance changes from the high state to the low state, whereas the maintaining signal is not outputted even if the absolute value of the differential coefficient in a second case exceeds the predetermined value, the second case being a case where the illuminance of the external light changes from the low state to the high state (e.g., at time t4). Alternatively, both in the first case and the second case, the maintaining signal may be outputted. In this case, for example, in Case C of FIG. 5, as the timer is restarted respectively at times t22, t23, and t24, the maintaining signal is outputted between times t22 to t24, and the maintaining signal is outputted during a period from time t24 until the predetermined period elapses. Further, a configuration may be employed in which the maintaining signal is not outputted in the first case but outputted in the second case. In this case, for example, in Case C of FIG. 5, the maintaining signal is not outputted at time t20, but the maintaining signal is outputted at time t22. Due to this, even though the illuminance of the external light changes from the low state to the high state at time t22, the light intensity ratio of the light source 14 is maintained in the high state. Also at time t24, similarly to the case of time t22, the light intensity ratio of the light source 14 is maintained in the high state as a result of the maintaining signal being outputted. In any of the above modifications, a human may be prevented from perceiving changes of the light intensity ratio frequently taking place within short periods of time. That is, the "light intensity ratio maintaining control" may be performed during a period from when the change amount of the illuminance exceeds the predetermined value until the predetermined period elapses.

(Modification 3)

In the above embodiments, the lighting device 10 controls the light source 14 such that the light intensity ratio of the light source 14 changes at a high speed from the low state to the high state in a case where the illuminance indicated by the external light signal changes rapidly from the high state to the low state (e.g., times t1 to t2 in FIG. 3). Further, the lighting device 10 controls the light source 14 such that the light intensity ratio of the light source 14 changes at a low speed from the high state to the low state in a case where the illuminance indicated by the external light signal changes rapidly from the low state to the high state (e.g., times t4 to t5). In a modification, the lighting device 10 may control the light source 14 such that the light intensity ratio of the light source 14 changes at a high speed from the high state to the low state also in the case where the illuminance indicated by the external light signal changes rapidly from the low state to the high state. That is, for example, in FIG. 3, an absolute value of a gradient of the light intensity ratio between time t1 and time t2 (that is, the above mentioned "first value") and an absolute value of a gradient of the light intensity ratio between time t4 and time t5 (that is, the above mentioned "second value") may be equal.

(Modification 4)

In the above embodiments, the controller 30 of the lighting device 10 comprises hardware configurations 32 to 36 such as logic circuit, and the above mentioned respective operations (each case of FIGS. 3 to 5) are realized by the hardware configurations 32 to 36. Instead of this, the controller 30 may comprise a CPU and a memory storing a program. In this case, the above mentioned respective operations may be realized by the CPU carrying out processes in accordance with the program in the memory.

Technical features described in the description and the drawings may technically be useful alone or in various combinations, and are not limited to the combinations as originally claimed. Further; the art described in the description and the drawings may concurrently achieve a plurality of aims, and technical significance thereof resides in achieving any one of such aims.

REFERENCE SIGNS LIST

10: Lighting Device, 12: External Light Sensor, 14: Light Source, 30: Controller, 32: External Light Change Detection Circuit, 34: Light Intensity Ratio Control Circuit, 36: Driver Circuit, and t1 to t36: Time

What is claimed is:

1. A lighting device disposed in a vehicle, the lighting device comprising:
   a light source disposed inside the vehicle;
   an external light sensor configured to detect illuminance of light outside of the vehicle; and
   a controller configured to control the light source such that a lower light intensity ratio of the light source is set for higher illuminance detected by the external light sensor, the controller performs a light intensity ratio maintaining control that controls the light intensity ratio of the light source to be maintained even when the illuminance changes from a low state to a high state during a period from when a change amount of the illuminance exceeds a predetermined value until a predetermined period elapses.

2. The lighting device according to claim 1, wherein the controller controls the light source such that the light intensity ratio of the light source is set lower in a case where the illuminance changes from the low state to the high state during the period and the illuminance is in the high state when the predetermined period elapses.

3. The lighting device according to claim 1, wherein
the controller performs the light intensity ratio maintaining control during the period from when the change amount of the illuminance changing from the high state to the low state exceeds the predetermined value until the predetermined period elapses, and
the controller does not perform the light intensity ratio maintaining control even when the change amount of the illuminance changing from the low state to the high state exceeds the predetermined value.

4. The lighting device according to claim 1, wherein
in a case where the change amount of the illuminance does not exceed again the predetermined value before the predetermined period has elapsed after the change amount of the illuminance had previously exceeded the predetermined value at a first timing, the controller performs the light intensity ratio maintaining control during a period from the first timing until the predetermined period elapses, and
in a case where the change amount of the illuminance exceeds again the predetermined value at a second timing before the predetermined period has elapsed after the change amount of the illuminance had previously exceeded the predetermined value at the first timing, the controller performs the light intensity ratio maintaining control during a period from the first timing until the second timing, and performs the light intensity ratio maintaining control during a period from the second timing until the predetermined period elapses.

5. The lighting device according to claim 1, wherein
the controller controls the light source such that the light intensity ratio becomes higher by a first value per unit time in a case where the illuminance changes from the high state to the low state, and
the controller controls the light source such that the light intensity ratio becomes lower by a second value per unit time in a case where the illuminance changes from the low state to the high state, the second value being smaller than the first value.

* * * * *